US006626133B2

United States Patent
Schell et al.

(10) Patent No.: US 6,626,133 B2
(45) Date of Patent: Sep. 30, 2003

(54) EXPLOSION PROTECTION SENSOR FOR GAS APPLIANCES

(75) Inventors: Michael B. Schell, Santa Barbara, CA (US); Andrian I. Kouznetsov, Santa Barbara, CA (US); Rod J. Valenta, Santa Barbara, CA (US)

(73) Assignee: Edwards Systems Technology, Inc, Cheshire, CT (US)

( * ) Notice: Subject to any disclaimer, the term of this patent is extended or adjusted under 35 U.S.C. 154(b) by 0 days.

(21) Appl. No.: 10/158,133

(22) Filed: May 31, 2002

(65) Prior Publication Data

US 2003/0154932 A1 Aug. 21, 2003

Related U.S. Application Data

(60) Provisional application No. 60/357,138, filed on Feb. 19, 2002.

(51) Int. Cl.[7] .............................................. F22B 37/42
(52) U.S. Cl. ................... 122/504; 122/13.01; 122/14.2; 392/441
(58) Field of Search ............................. 122/14.1, 14.2, 122/504, 13.01; 241/31; 392/441–482

(56) References Cited

U.S. PATENT DOCUMENTS

| 2,815,035 | A | * | 12/1957 | Eskin et al. ................. 137/65 |
| 3,581,062 | A | * | 5/1971 | Aston ........................ 219/501 |
| 5,749,327 | A | * | 5/1998 | Kim .......................... 122/14.2 |
| 5,857,482 | A | * | 1/1999 | Dowling ..................... 137/312 |
| 6,035,812 | A | * | 3/2000 | Harrigill et al. ............ 122/504 |
| 6,250,133 | B1 | | 6/2001 | Schell ........................ 73/23.31 |
| 6,269,779 | B2 | * | 8/2001 | Overbey, Jr. .............. 122/13.01 |
| 6,276,309 | B1 | * | 8/2001 | Zeek .......................... 122/504 |
| 6,390,028 | B1 | * | 5/2002 | Langmead et al. ........ 122/14.2 |
| 6,412,447 | B1 | * | 7/2002 | Trant et al. ............... 122/14.21 |

* cited by examiner

*Primary Examiner*—Gregory Wilson
(74) *Attorney, Agent, or Firm*—Baker & Hostetler, L.L.P.

(57) ABSTRACT

A device for sensing a dangerous condition includes a sensor that provides a signal when a dangerous condition is sensed by the sensor. A power source is provided which is in communication with the sensor. The power source supplies the sensor with power. A trigger is provided which is in communication with the sensor. The trigger is activated by the signal to prevent the dangerous condition from producing a harmful effect. In one embodiment of the invention the power source is a thermoelectric power supply and the sensor is a self calibrating sensor.

19 Claims, 3 Drawing Sheets

EXPLOSION PROTECTION SENSOR FOR GAS APPLIANCES

PRIORITY

This application claims the benefit of U.S. Provisional Application No. 60/357,138 filed on Feb. 19, 2002.

FIELD OF THE INVENTION

The present invention relates generally to sensing devices. More particularly, the present invention relates to self-powered sensing devices used for the detection of dangerous environments that can cause an explosion or a fire around appliances such as water heaters, stoves, gas fireplaces, etc.

BACKGROUND OF THE INVENTION

Currently there are studies warning consumers of the dangers of storing flammable materials in close proximity to water heaters. In particular, there is a concern with the presence of liquids that give off flammable vapors such as gasoline. Approximately 50 million homes have gas water heaters with an additional 3.5 million new heaters sold each year. Gas-fired water heaters igniting flammable vapors are associated with nearly 2,000 fires a year, resulting in an estimated 316 injuries, 17 deaths, and $26 million in property damage for a total societal cost, which may be as high as $395 million. Typically, injuries occur when the victim is using a flammable liquid (usually gasoline) for cleaning purposes or when the liquid leaks or is accidentally spilled near a water heater. Water heaters are often installed in locations where people might normally place other things for storage including flammable liquids (e.g. garages, basements, utility areas).

Water heater manufacturers have tried to educate consumers on measures that can be taken to reduce risk of fires related to water heaters and flammable vapors including:

Making sure gas fired water heaters are installed according to code requirements.

Elevating heaters (gas vapors are heavier than air) where possible.

Avoiding the use gasoline to clean equipment or tools.

Using gasoline only as a motor fuel.

Storing gasoline only in tightly sealed red containers intended for gasoline.

Keeping all flammable materials and liquids away from gas fired heaters.

There are two types of water heaters sold in the US. The vast majority of water heaters are naturally vented appliances that typically utilize a pilot light to light the heater and to provide a continuous natural draft for the exhaust flue of the heater. These types of water heaters typically do not require external power. About 10% of gas heaters sold are power vented where a fan is activated to induce a draft in a flue to exhaust combustion fumes. Both types of units draw combustion air from the area below the water heater. The risk occurs when the open flame or igniter of the water heater is exposed to flammable vapors from liquids stored nearby.

One possible solution is to utilize a sensor that could sense the presence of combustible vapors and which would turn off the pilot light or prevent a fan powered water heater. A specification for such a device should have the following characteristics:

Ability to sense hydrocarbon fumes like gasoline vapors very quickly and efficiently.

Ability to send a control signal to interact with water heater operation.

Long lifetime.

Ability to operate in high and low humidity environments.

The sensor must not require calibration or if calibration is required the sensor must be able to send a signal to the control that it is non functional.

In addition, for the vast majority of non-vented water heaters, a source of power for a sensor may not be available.

Traditional approaches to hydrocarbon sensing including electrochemical cell, metal oxide sensors and catalytic bead are problematic for this application because of the detection speed, lifetime, calibration and humidity requirements.

Infrared sensing has some inherent advantages as a sensor, but the conventional technology does need innovation to be applied to this application which also demands low product cost.

Accordingly, a system which is easily calibrated and can operate in high and low humidity environments is desired.

In addition, a system that is self-powered and can detect multiple vapors is also desired.

SUMMARY OF THE INVENTION

It is therefore a feature and advantage of the present invention to provide a sensor that is easily calibrated and operates in high and low humidity environments. In one embodiment of the invention the sensor does not require external calibration. In another embodiment the sensor requires calibration and sends a signal indicating that the sensor is non-functional.

It is another feature and advantage of the present invention to provide a sensor that is self powered and that can detect multiple vapors.

It is also another feature and advantage of the present invention to provide a sensor that has the ability to sense hydrocarbon fumes like gasoline vapors very quickly and efficiently.

It is also another feature and advantage of the present invention to provide a sensor that has the ability to send a signal to interact with water heater operation.

It is also another feature and advantage of the present invention to provide a sensor that has a long lifetime and that is self-powering.

The above and other features and advantages are achieved through the use of a novel device for sensing a dangerous environment as herein disclosed. In accordance with one embodiment of the present invention, a device for sensing a dangerous condition includes a sensor that provides a signal when a dangerous condition is sensed by the sensor. A power source in communication with the sensor is provided. The power source supplies the sensor with power. A trigger is provided which is in communication with the sensor. The trigger is activated by the signal to prevent the dangerous condition from producing a harmful effect.

In accordance with another embodiment of the present invention, a system for sensing a dangerous condition includes a sensing means for detecting a dangerous condition and providing a signal indicating that the dangerous condition has been detected. A power source means is provided for supplying the sensing means with power. The power source means is in communication with the sensor. A trigger means is provided for preventing the dangerous condition from producing a harmful effect when activated. The trigger means is in communication with the sensor means and is activated by the signal.

In accordance with another embodiment of the present invention, a method of preventing a harmful effect of a dangerous condition includes the steps of providing a sensor with power from a power source and using the sensor to determine if there is a dangerous condition when the sensor detects a dangerous condition, the dangerous condition is prevented from producing a harmful effect.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

This invention includes a number of enhancements to the design of an infrared hydrocarbon sensor to make it more suitable and adaptable to this application for hydrocarbon measurement. Many of these innovations could also be applied to other gas fired appliances such as furnaces, cooking ranges radiant heaters and fireplaces or to the control mechanisms associated with regulating combustion such as gas valves and associated controls.

Figure 1:
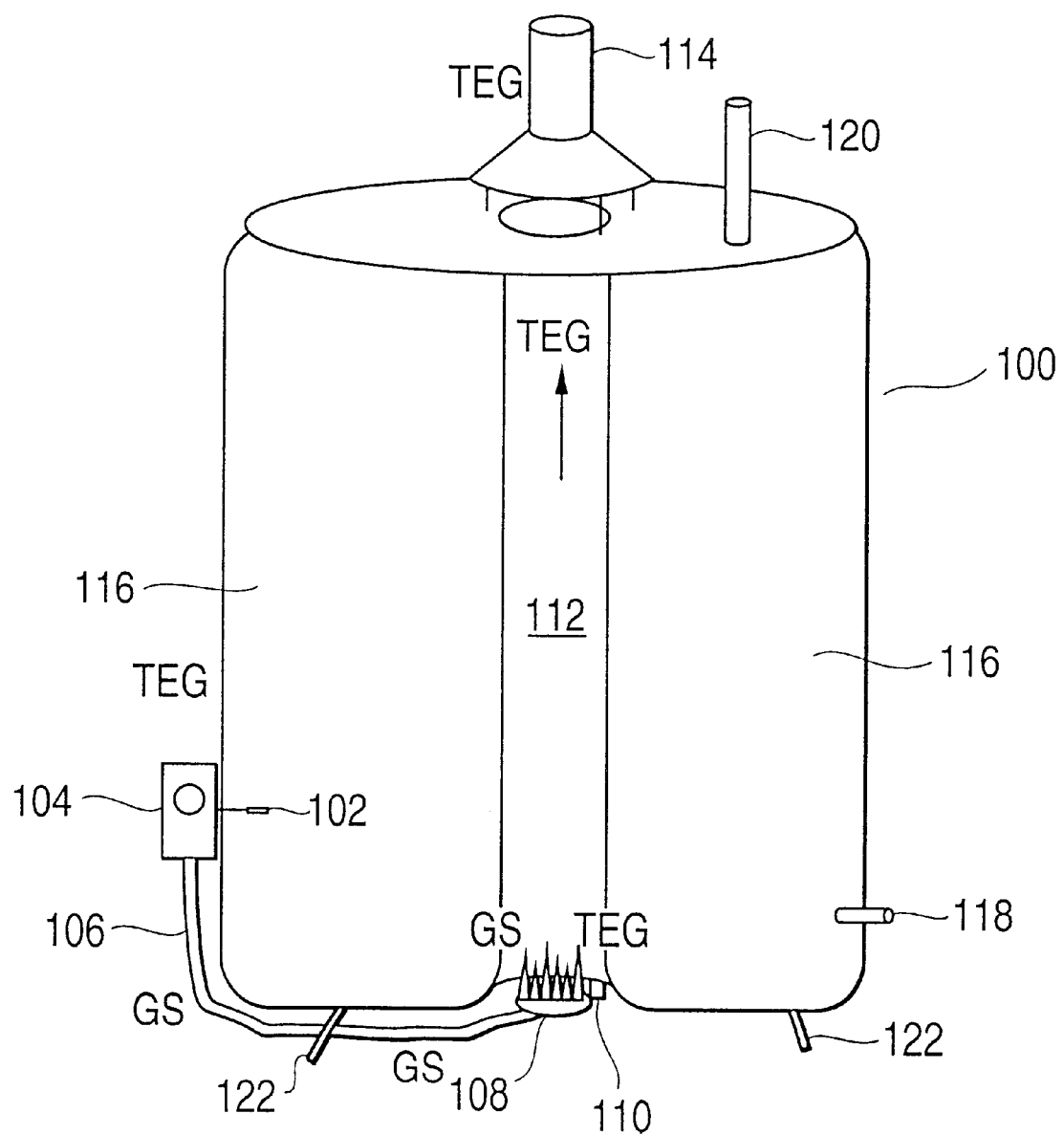
FIG. 1 is an illustration of a gas sensor utilizing a thermoelectric generator in a water heater.

FIG. 1 is an illustration of a gas sensor (GS) utilizing a thermoelectric generator (TEG) in a water heater 100. The multiple placements of the gas sensor (GS) and the thermoelectric generator (TEG) illustrate some of the locations the GS and TEG can be effectively placed.

Water heater 100 has a temperature sensor 102 connected to a gas valve/temperature control mechanism 104. A gas line 106 is connected to the gas valve/temperature control mechanism 104 at one end and to a burner 108 at another end. A igniter or pilot light 110 is located next to the burner 108. An exhaust 112 is located above burner 108 as an outlet for hot air and combustion fumes. A flue 114 is located above the exhaust 112 and is vented to the roof.

The water heater 100 has a storage compartment 116 for the storage of a liquid such as water. Storage compartment 116 has a cold water inlet 118 and a hot water outlet 120. Support legs 122 are provided at the bottom of water heater 100 for stability.

The operation of water heater 100 is as follows. The gas valve/temperature control mechanism 104 can be set to control the temperature of the water stored in storage compartment 116. When temperature sensor 102 senses that the water temperature is not at the appropriate level, gas is transmitted to burner 108 through gas line 106. The gas is ignited by igniter or pilot light 110 and the water stored in storage compartment 102 is heated. Hot air and combustion fumes emitted from burner 108 are transmitted through exhaust 112 and through flue 114.

When the water in storage compartment 116 reaches an appropriate level, sensor 102 will send a signal to gas valve/temperature control mechanism 104 to appropriately regulate the flow of gas to burner 108.

In one embodiment of the invention, a gas sensor (GS) is placed in an area where a dangerous environment can be easily detected. As shown in FIG. 1 this can be in a multitude of locations around water heater 100. In one embodiment of the invention, the gas sensor (GS) can be located along gas line 106 or around burner 108.

The thermoelectric generator (TEG) can be located preferably in locations where there is a differential in temperature. For example as shown in FIG. 1, the TEG can be located around the flue 114, the exhaust 112, the burner 110 or the storage compartment 116.

The gas sensor (GS) can be an infrared sensor. The sensor design can be calibrated and configured so that it is capable of detecting both the gas type used as a fuel source (e.g. natural gas or propane) to indicate malfunctioning equipment and to detect common flammable vapors that can cause accidental combustion (e.g. gasoline). Such a sensor can be placed in the ambient air below the water heater or at a location close to the floor to detect vapors that are heavier than air. An alternative location would be in the exhaust flue of the appliance. To ensure long term stability and low cost, a single beam sensor could be utilized which uses a self calibration algorithm similar that incorporated in Telaire's $CO_2$ sensors where the sensor electronics periodically checks background levels over a number of different time periods and then calibrates itself to consider these background concentrations close to zero. For $CO_2$, background levels are generally achieved when a space goes unoccupied during the evening hours (and inside levels drop to background levels). In this case the sensor remembers the lowest concentration over a 24 hour period as it relates to the occupied/unoccupied cycles of building occupancy.

For hydrocarbon or gasoline vapor. There should be no presence of gasoline vapors in normal conditions. Also when gasoline vapors do occur, it can be expected that concentration increase will take place over a relatively rapid period of time involving minutes, hours or in some cases days. This is in contrast to the natural drift of a well designed and manufactured sensor that should exhibit a very gradual increase or decrease in calibration over a number of months that is quantifiable by the manufacturer. Programming in the signal analysis of the sensor would be designed to consider the following parameters:

The sensor would be initially calibrated to ambient conditions when the sensor or water heater was installed in final location. This calibration could be activated manually by the installer activating the calibration (e.g. press a button) or automatically by programming the sensor to calibrate itself when first firing of the water heater occurs or when the sensor is first powered up (if line power is provided). While it is unlikely to be necessary this calibration could also be activated at any time during the sensor life during regular service or when the sensor indicates a need for calibration as a result of self diagnostics.

The sensor would activate a control signal if the concentration of explosive vapors exceed a predetermined Low Flame Limit (LFL) concentration (well below the point of 100% LFL). This control signal could be used to prevent ignition of the combustion source and/or to provide an alarm indication.

For self calibration the sensor would periodically check and remember the lowest background levels measured over an extended period of time of two to three months by remembering the lowest point measured on a periodic basis (e.g. weekly) and integrating these levels over the two to three month period. Based on the long term change of the background level the zero calibration of the sensor could be adjusted.

If the sensor detects an increase in short term concentrations, but not over the required threshold limit, the sensor logic would distinguish this type of increase as an actual exposure to hydrocarbons and sound an alarm or provide a control signal that could require the environment to be checked and if necessary the sensor to be checked or recalibrated.

For water heaters and other combustion devices that rely on line power to operate, the sensor can draw from this line power. However many gas appliances do not require line power to operate. For example, approximately 90 percent of the water heaters in North America are sold to operate without a source of power. Typically a continuously burning pilot light provides a source of combustion when there is demand for hot water. In some cases a sparking device of some sort may also provide a source of ignition. In these applications the sensor design must have provisions for operating where there is no line power. Even if line power is readily available, in the case of a power outage, many combustion devices will continue to operate including water heaters, ranges, fireplaces and cooking ranges. Also gas appliance used in portable and mobile applications (boats, RV's, camping equipment) will typically not require line power to operate.

Current infrared sensor designs consume so much power that it is probably unfeasible to make a battery operated sensor that could operate continuously under a battery operation only. Most installations would require that no maintenance is required over the life of the combustion device. Manufacturers of fire detectors that require periodic battery replacement have been the subject of numerous lawsuits when homeowners fail to replace batteries and the fire detector becomes non functional, manufacturers and users would prefer a no maintenance option. A number of strategies can be employed to conserve power and perhaps rely on parasitic form of power to ensure sensor operation when line power is unavailable.

In one embodiment of the invention in order to conserve power, the sensor would only be operated when there is a call for combustion and the burner is operating. In the case of a water heater the sensor would activate/power up upon a call for combustion and make a measurement for explosive vapors before combustion actually occurred. If no explosive vapors are detected above the target threshold range the combustion cycle would proceed. When the burner shuts off, the sensor would deactivate/power down until the next call for combustion. For devices where there is also a need to sense if combustion occurs (e.g. ranges of fireplaces) the sensor could continue operating for a preset period of time to confirm there is no build up of flammable vapors.

Such a sensor could be designed to operate off a battery that could be recharged using a thermoelectric (TE) generator which can convert heat to an electrical signal. There are already several commercially available TE generators available that are relatively inexpensive and would be well suited to the temperature and power requirement of this type of application. The TE generator can be located separate from the sensor so that it can take full advantage of the heat generated from the combustion device. A TE generator is typically a small wafer like device (e.g. 40×40×5 mm) generates electricity based on a difference in temperature experienced between the two sides of the device. Such generators are currently being used in wearable medical devices where the body heat from the patent is used to recharge a battery used to operate the device. A TE generator may can be selected with the performance characteristics to generate enough electricity to recharge the battery during the typical temperature rise of the gas fired appliance temperature. Location of the sensor is very important. In some locations a significant temperature rise may only occur as long as there is a temperature difference between the two surfaces, but once a steady-state was is achieved, no more generation would take place until the combustion system is turned off and cooled down. However, in some cases a location may be found for the TE generator that could create a more sustained temperature differential that could generate power throughout the combustion cycle (i.e. in the wall of a exhaust flue where one side is exposed to the heated combustion exhaust and the other side of the cooler is exposed to ambient air temperatures. (This use of a TE cooler to power a sensor may deserve to be a separate patent application). It also is applicable to a wide variety of combustion devices.

Another approach to sensor design could involve the design of an infrared sensor that could measure both hydrocarbons and $CO_2$. Hydrocarbons could detect explosive gases or lack of combustion and $CO_2$ could be used to indicate in-flue combustion efficiency or a situation of a improperly vented combustion appliance when measured in ambient air (see Method for Detecting Venting of a Combustion Appliance within an Improper Space, U.S. Pat. No. 6,250,133, which is incorporated by reference). Infrared technology has the advantage that additional gas sensing channels can be added at a small incremental cost because the optical assembly and signal processing electronics can be shared by a multiple channel detector with multiple optical filters tuned to different gas wavelengths. Such a device could also be designed to also detect carbon monoxide (incomplete combustion, lack of combustion air, safety concern) and water vapor (also potentially used for detecting presence of combustion and the efficiency of combustion).

Figure 2:
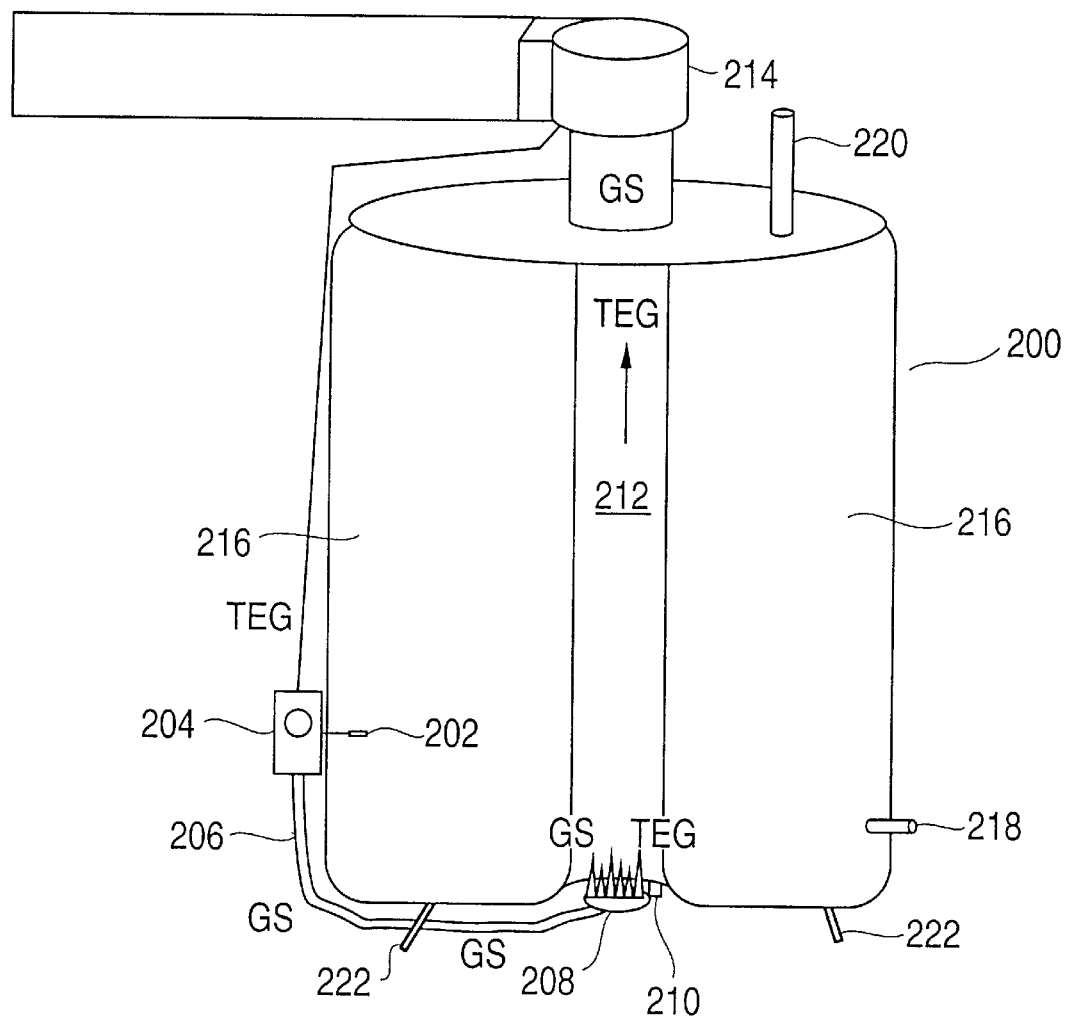
FIG. 2 is an illustration of a gas sensor utilizing a thermoelectric generator in a water heater using a power blower vent.

FIG. 2 is an illustration of a power vented water heater. Power vented water heater 200 has a temperature sensor 202 connected to a gas valve/temperature control mechanism 204. A gas line 206 is connected to the gas valve/temperature control mechanism 204 at one end and to a burner 208 at another end. A igniter or pilot light 210 is located next to burner 208. An exhaust 212 is located above burner 208 as an outlet for hot air and combustion fumes. A blower/power vent 214 is located above the exhaust 212 and is vented to the roof or side wall.

The water heater 200 has a storage compartment 216 for the storage of a liquid such as water. Storage compartment 216 has a cold water inlet 218 and a hot water outlet 220. Support legs 222 are provided at the bottom of water heater 200 for stability.

Power vented water heaters comprise about 10% of the current water heater market. With a power vent system an additional feature may be added to the sensor. If elevated LFL concentration were detected in the space another control response could be to turn on the blower/power vent 214 to reduce the concentration of explosive gases in the space while preventing ignition of the combustion source.

In this embodiment of the invention, the sensor can be placed in an appropriate location to utilize the suction created by the blower/power vent 214. This will draw a gas sample through the sensor, thereby, speeding up response time. When blower/power vent 214 is not operating the sensor will operate on a diffusion basis. These types of sensor could also be integrated into the control mechanism for gas valves to detect leaks or malfunctioning of the valve, which has been a periodic problem in the gas valve industry.

Figure 3:
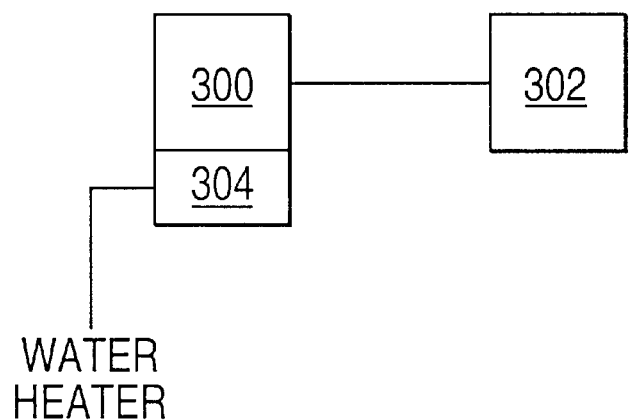
FIG. 3 is an illustration of a sensor having a thermoelectric generator and a trigger for communicating with a water heater.

FIG. 3 is an illustration of a sensor having a thermoelectric generator (TEG) and a trigger for transmitting signals. The gas sensor 300 is connected to and powered by a thermoelectric generator 302. When the gas sensor 300 detects a dangerous condition, trigger 304 is activated. Trigger 304 is connected to the water heater to prevent a dangerous situation such as an explosion or a fire. In one embodiment of the invention, trigger 304 is connected to a gas line to prevent gas from being fed to the burner. In another embodiment of the invention, trigger 304 is connected to the igniter or pilot light (110, 210) to prevent the igniter or pilot light (110, 210) from being activated. Yet in another embodiment of the invention, trigger 304 is connected to blower/power vent 214. When trigger 304 is activated, blower/power vent 214 is activated in order to reduce the concentration of explosive gas in the exhaust 212.

Figure 4:
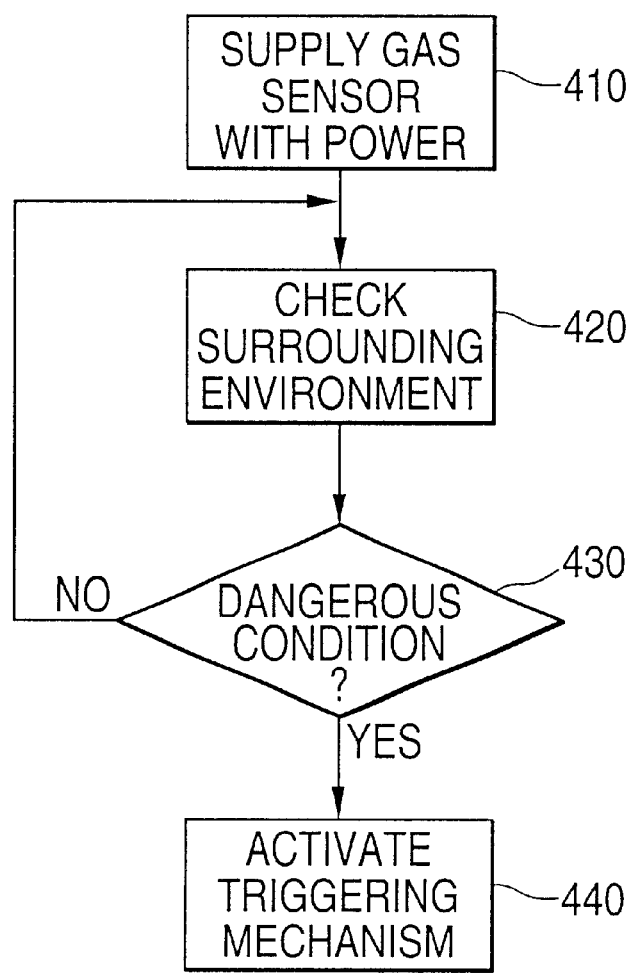
FIG. 4 is an illustration of the method steps of the present invention.

FIG. 4 is an illustration of the method steps of the present invention. In step 410 the gas sensor (GS) is supplied with power. In one embodiment of the invention, the gas sensor (GS) is supplied with power from a thermoelectric generator (TEG). In step 420 the environment surrounding the sensor is evaluated to determine if dangerous gasses or vapors are present. In step 430 if there are no dangerous conditions detected, the surrounding environment is again checked for dangerous conditions. This process will be repeated. In step 430, if a dangerous condition is detected, the gas sensor (GS) will activate a triggering mechanism in step 440. The triggering mechanism in one embodiment of the invention can appropriately regulate or shut down the flow of gas to a burner in the water heater. In another embodiment of the invention the triggering mechanism can activate a blower/power vent 214 to reduce the concentration of explosive gases in the space while preventing ignition of the combustion source. In another embodiment of the invention, the triggering mechanism can prevent the igniter or pilot light (110, 210) from being activated.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed:

1. A device for sensing a dangerous condition comprising:
   a sensor that provides a signal when a dangerous condition is sensed by said sensor;
   a power source in communication with said sensor, said power source supplying said sensor with power; and
   a trigger in communication with said sensor, said trigger activated by said signal to prevent said dangerous condition from producing a harmful effect, wherein said sensor comprises a calibrator that periodically measures background concentration levels.

2. The device as recited in claim 1, wherein said power source is a thermoelectric power source.

3. The device as recited in claim 1, wherein said sensor is a self-calibrating sensor.

4. The device as recited in claim 1, wherein said background concentration is $CO_2$ concentration.

5. The device as recited in claim 1, wherein said background concentration is natural gas concentration.

6. The device as recited in claim 1, wherein said background concentration is propane concentration.

7. A device for sensing a dangerous condition comprising:
   a sensor that provides a signal when a dangerous condition is sensed by said sensor;
   a power source in communication with said sensor, said power source supplying said sensor with power; and
   a trigger in communication with said sensor, said trigger activated by said signal to prevent said dangerous condition from producing a harmful effect, wherein said sensor is an infrared sensor.

8. The device as recited in claim 7, wherein said power source is a thermoelectric power source.

9. The device as recited in claim 7, wherein said sensor is a self-calibrating sensor.

10. A system for sensing a dangerous condition comprising:
    a sensing means for detecting a dangerous condition and providing a signal indicating that said dangerous condition has been detected;
    a power source means for supplying said sensing means with power, said power source means in communication with said sensor; and
    a trigger means for preventing said dangerous condition from producing a harmful effect when activated, said trigger means in communication with said sensor means and activated by said signal, wherein said sensor means comprises a calibrating means for measuring background concentration levels.

11. The device as recited in claim 10, wherein said power source means is a thermoelectric power source.

12. The device as recited in claim 10, wherein said sensing means is a self-calibrating sensor.

13. The device as recited in claim 10, wherein said background concentration is $CO_2$ concentration.

14. The device as recited in claim 10, wherein said background concentration is natural gas concentration.

15. The device as recited in claim 10, wherein said background concentration is propane concentration.

16. A system for sensing a dangerous condition comprising:

a sensing means for detecting a dangerous condition and providing a signal indicating that said dangerous condition has been detected;

a power, said power source means for supplying said sensing means with power source means in communication with said sensor; and a trigger means for preventing said dangerous condition from producing a harmful effect when activated, said trigger means in communication with said sensor means and activated by said signal, wherein said sensor means is an infrared sensor.

17. The device as recited in claim 16, wherein said power source means is a thermoelectric power source.

18. The device as recited in claim 16, wherein said sensing means is a self-calibrating sensor.

19. A method of preventing a harmful effect of a dangerous condition comprising the steps of:

providing a sensor with power from a power source;

using the sensor to determine if there is a dangerous condition; and preventing the dangerous condition from producing a harmful effect when the sensor detects a dangerous condition, wherein said sensor is an infrared sensor.

* * * * *